United States Patent
Sharma et al.

(10) Patent No.: US 12,478,250 B2
(45) Date of Patent: Nov. 25, 2025

(54) IMAGING A TARGET WITHIN AN EYE AND CALIBRATING IMAGING DEVICES

(71) Applicant: Alcon Inc., Fribourg (CH)

(72) Inventors: Utkarsh Sharma, Solon, OH (US); Zsolt Bor, San Clemente, CA (US)

(73) Assignee: Alcon Inc., Fribourg (CH)

( * ) Notice: Subject to any disclaimer, the term of this patent is extended or adjusted under 35 U.S.C. 154(b) by 430 days.

(21) Appl. No.: 18/049,963

(22) Filed: Oct. 26, 2022

(65) Prior Publication Data
US 2023/0157537 A1 May 25, 2023

Related U.S. Application Data

(60) Provisional application No. 63/281,487, filed on Nov. 19, 2021.

(51) Int. Cl.
*A61B 3/10* (2006.01)
*A61B 3/14* (2006.01)
*A61B 5/00* (2006.01)

(52) U.S. Cl.
CPC .............. *A61B 3/102* (2013.01); *A61B 3/14* (2013.01); *A61B 5/0066* (2013.01)

(58) Field of Classification Search
CPC ......... A61B 3/102; A61B 3/14; A61B 5/0066; A61F 2009/00855; A61F 2009/00874; A61F 2009/00885; A61F 9/008
(Continued)

(56) References Cited

U.S. PATENT DOCUMENTS

| 3,780,979 A | 12/1973 | De |
| 4,357,088 A | 11/1982 | Pomerantzeff |

(Continued)

FOREIGN PATENT DOCUMENTS

| AU | 2018274939 B2 | 6/2020 |
| CN | 210009227 U | 2/2020 |

(Continued)

OTHER PUBLICATIONS

Adrian G.H. Podoleanu et al., Combined optical coherence tomograph and scanning laser ophthalmoscope mi nije dostupan besplatno., Electronics Letters, 34 (11), 1998.
(Continued)

*Primary Examiner* — Mohammed A Hasan
(74) *Attorney, Agent, or Firm* — PATTERSON + SHERIDAN, LLP

(57) ABSTRACT

In certain embodiments, an ophthalmic laser surgical system for imaging and treating a target in an eye includes an imaging system with an optical coherence tomography (OCT) device that directs an OCT imaging beam along an imaging beam path towards the target in the eye, and generates OCT images from the OCT imaging beam reflected from the eye. The beam combining and alignment device aligns the OCT imaging beam and the laser beam. The laser-OCT xy-scanner: receives the OCT imaging beam from the imaging system, directs the OCT imaging beam along the imaging beam path towards the eye, and scans the OCT imaging beam in an xy-plane in the eye; and receives the laser beam from the laser device, directs the laser beam along the laser beam path aligned with the imaging beam path towards the eye, and scans the laser beam in the xy-plane in the eye.

20 Claims, 5 Drawing Sheets

(58) Field of Classification Search
USPC .................................................... 351/206
See application file for complete search history.

(56) References Cited

U.S. PATENT DOCUMENTS

| | | |
|---|---|---|
| 5,312,396 A | 5/1994 | Feld |
| 5,909,270 A | 6/1999 | Moser |
| 6,142,630 A | 11/2000 | Koester |
| 6,322,556 B1 | 11/2001 | Gwon |
| 6,789,900 B2 | 9/2004 | Van De Velde |
| 7,374,287 B2 | 5/2008 | Van De Velde |
| 7,510,282 B2 | 3/2009 | Ueno |
| 7,520,613 B2 | 4/2009 | Saito et al. |
| 7,703,922 B2 | 4/2010 | Van De Velde |
| 8,480,659 B2 | 7/2013 | Frey et al. |
| 8,652,602 B1 | 2/2014 | Dolla |
| 8,783,868 B2 | 7/2014 | Qiu |
| 8,876,808 B2 | 11/2014 | Feklistov et al. |
| 8,994,753 B2 | 3/2015 | Nakano |
| 9,033,500 B2 | 5/2015 | Utsunomiya |
| 9,603,519 B2 | 3/2017 | Bor et al. |
| 9,675,243 B2 | 6/2017 | Sasak et al. |
| 9,789,002 B2 | 10/2017 | Van De Velde |
| 10,130,511 B2 | 11/2018 | Dantus |
| 10,478,342 B2 | 11/2019 | Dick |
| 10,555,835 B2 | 2/2020 | Schuele et al. |
| 2007/0258094 A1 | 11/2007 | Izatt et al. |
| 2007/0291277 A1 | 12/2007 | Everett |
| 2009/0073384 A1 | 3/2009 | Warden |
| 2009/0137989 A1 | 5/2009 | Kataoka |
| 2009/0177497 A1* | 7/2009 | Raksi .................. G16H 20/40 705/2 |
| 2009/0196477 A1 | 8/2009 | Cense et al. |
| 2010/0123873 A1 | 5/2010 | Raymond |
| 2010/0152847 A1 | 6/2010 | Padrick |
| 2011/0077557 A1 | 3/2011 | Wing et al. |
| 2012/0281235 A1 | 11/2012 | Murata |
| 2013/0131652 A1 | 5/2013 | Dick |
| 2013/0173029 A1 | 7/2013 | Caldeira et al. |
| 2014/0058367 A1 | 2/2014 | Dantus |
| 2014/0216468 A1 | 8/2014 | Goldshleger |
| 2014/0257257 A1 | 9/2014 | Grant et al. |
| 2014/0268036 A1 | 9/2014 | Ketterling et al. |
| 2014/0276674 A1 | 9/2014 | Lee |
| 2015/0190278 A1 | 7/2015 | Gooding |
| 2015/0342782 A1 | 12/2015 | Mordaunt |
| 2016/0058617 A1 | 3/2016 | Luttrull et al. |
| 2016/0074214 A1 | 3/2016 | Palanker et al. |
| 2016/0074221 A1 | 3/2016 | Tassignon et al. |
| 2016/0166431 A1 | 6/2016 | Vogler et al. |
| 2016/0227999 A1 | 8/2016 | An et al. |
| 2016/0235588 A1 | 8/2016 | Hart et al. |
| 2016/0256324 A1 | 9/2016 | Suzuki |
| 2016/0278629 A1 | 9/2016 | Schuele |
| 2016/0302969 A1 | 10/2016 | Yamamoto |
| 2017/0181625 A1 | 6/2017 | Kawakami et al. |
| 2017/0252213 A1 | 9/2017 | Furuuchi et al. |
| 2017/0326003 A1 | 11/2017 | Schuele et al. |
| 2018/0028354 A1 | 2/2018 | Heeren |
| 2018/0028355 A1 | 2/2018 | Raksi |
| 2018/0140257 A1 | 5/2018 | Govindjee et al. |
| 2018/0206719 A1 | 7/2018 | Adler et al. |
| 2018/0317767 A1 | 11/2018 | Ryan |
| 2018/0353064 A1 | 12/2018 | Soetikno et al. |
| 2018/0366915 A1 | 12/2018 | Xia et al. |
| 2019/0159933 A1 | 5/2019 | Romano et al. |
| 2019/0282403 A1 | 9/2019 | Barrett et al. |
| 2019/0290124 A1 | 9/2019 | Laforest et al. |
| 2019/0313903 A1 | 10/2019 | Mckinnon |
| 2019/0365569 A1 | 12/2019 | Skovgaard et al. |
| 2020/0038241 A1* | 2/2020 | Wang .................. A61F 9/009 |
| 2020/0060873 A1 | 2/2020 | Heeren |
| 2020/0085292 A1 | 3/2020 | Fukuma et al. |
| 2020/0129336 A1* | 4/2020 | Schuele ............ A61F 9/00825 |
| 2020/0130103 A1 | 4/2020 | Choi |
| 2020/0192080 A1 | 6/2020 | Karam |
| 2020/0196853 A1 | 6/2020 | Van Hemert et al. |
| 2020/0261267 A1* | 8/2020 | Simoneau ............ A61B 3/102 |
| 2020/0273218 A1 | 8/2020 | Camino et al. |
| 2020/0397289 A1 | 12/2020 | Ralston |
| 2020/0400422 A1 | 12/2020 | Ralston |
| 2021/0100450 A1 | 4/2021 | Amma |
| 2021/0186753 A1 | 6/2021 | Al-Qaisi et al. |
| 2021/0275009 A1 | 9/2021 | Yates |
| 2021/0378507 A1 | 12/2021 | Wallace |
| 2021/0386586 A1 | 12/2021 | Bor |
| 2022/0012459 A1 | 1/2022 | Schwiegerling |
| 2022/0031511 A1 | 2/2022 | Charles |
| 2023/0157882 A1* | 5/2023 | Bor .................... A61F 9/008 606/4 |
| 2023/0157884 A1* | 5/2023 | Bor .................. A61F 9/00825 606/5 |
| 2023/0157889 A1 | 5/2023 | Bor |

FOREIGN PATENT DOCUMENTS

| | | |
|---|---|---|
| CN | 108371542 B | 4/2020 |
| CN | 109196333 B | 12/2020 |
| CN | 111281651 B | 12/2020 |
| CN | 112862782 A | 5/2021 |
| CN | 112587302 B | 6/2021 |
| CN | 112587304 B | 6/2021 |
| DE | 19705044 A1 | 8/1998 |
| DE | 102019007147 A1 | 4/2021 |
| DE | 102019007148 A1 | 4/2021 |
| EP | 0770370 A2 | 2/1997 |
| EP | 1212022 B1 | 3/2005 |
| EP | 1563785 A1 | 8/2005 |
| EP | 1638452 B1 | 10/2006 |
| EP | 1838212 A1 | 10/2007 |
| EP | 2144552 A1 | 1/2010 |
| EP | 1928297 B1 | 11/2010 |
| EP | 2459138 A2 | 6/2012 |
| EP | 2525706 A2 | 11/2012 |
| EP | 2898820 A1 | 7/2015 |
| EP | 3061429 A1 | 8/2016 |
| EP | 2890340 B1 | 2/2017 |
| EP | 3459487 A1 | 3/2019 |
| EP | 3501463 A1 | 6/2019 |
| EP | 3636137 A1 | 4/2020 |
| EP | 3861924 A1 | 8/2021 |
| GB | 2469249 A | 10/2010 |
| JP | 5767014 B2 | 6/2015 |
| JP | 2017176558 A | 10/2017 |
| JP | 6410468 B2 | 10/2018 |
| JP | 2018196821 A | 12/2018 |
| JP | 2018196822 A | 12/2018 |
| JP | 2020022569 A | 2/2020 |
| JP | 6736304 B2 | 7/2020 |
| JP | 6839902 B2 | 2/2021 |
| RU | 2661016 C1 | 7/2018 |
| RU | 2692666 C1 | 6/2019 |
| RU | 2695629 C1 | 7/2019 |
| RU | 2710058 C2 | 12/2019 |
| RU | 2726468 C1 | 7/2020 |
| WO | 9958047 A1 | 11/1999 |
| WO | 0137769 A1 | 5/2001 |
| WO | 0195791 A1 | 12/2001 |
| WO | 2007059189 A2 | 5/2007 |
| WO | 2009033110 A2 | 3/2009 |
| WO | 2009036104 A2 | 3/2009 |
| WO | 2009039315 A2 | 3/2009 |
| WO | 2009059400 A1 | 5/2009 |
| WO | 2010117386 A1 | 10/2010 |
| WO | 2014053824 A1 | 4/2014 |
| WO | 2015131135 A1 | 9/2015 |
| WO | 2015171793 A1 | 11/2015 |
| WO | 2016033590 A1 | 3/2016 |
| WO | 2017062673 A1 | 4/2017 |
| WO | 2017196306 A1 | 11/2017 |
| WO | 2017205857 A1 | 11/2017 |
| WO | 2020074532 A1 | 4/2020 |
| WO | 2020180729 A1 | 9/2020 |
| WO | 2020215359 A1 | 10/2020 |

(56) References Cited

FOREIGN PATENT DOCUMENTS

| WO | 2020216763 A1 | 10/2020 |
|---|---|---|
| WO | 2020257711 A1 | 12/2020 |
| WO | 2021023799 A1 | 2/2021 |
| WO | 2021049243 A1 | 3/2021 |
| WO | 2021066047 A1 | 4/2021 |
| WO | 2021092211 A1 | 5/2021 |
| WO | 2021183637 A1 | 9/2021 |
| WO | 2022149028 A1 | 7/2022 |
| WO | 2023089416 A1 | 5/2023 |
| WO | 2023089459 A1 | 5/2023 |
| WO | 2023097391 A1 | 6/2023 |

OTHER PUBLICATIONS

Chi-Hung Lee, et al., Imaging vitreous floaters and cataracts with optical simulations, Optik, 194, 1-9, 2019.

Christy K. Sheehy et al., High-speed, image-based eye tracking with a scanning laser ophthalmoscope, Biomedical Optics Express, vol. 3, No. 10, 2012.

D. H. Kelly, "Retinal Inhomogeneity. II. Spatial Summation," J. Opt. Soc. Am., pp. 114-119, vol. 1, No. 1 (Jan. 1984).

D. H. Kelly, "Retinal Inhomogeneity. III. Circular-Retina Theory," D.H. Kelly, J. Opt. Soc. Am., pp. 810-819, vol. 2, No. 6 (Jun. 1985).

D.H. Kelly, "Visual Processing of Moving Stimuli," J. Opt. Soc. Am., pp. 216-225, vol. 2, No. 2 (Feb. 1985).

D.H. Kelly,, "Motion and Vision. II. Stabilized Spatio-Temporal Threshold Surface," J. Opt. Soc. Am., pp. 1340-1349, vol. 69, No. 10 (Oct. 1979).

D.H.Kelly, "Retinal Inhomogeneity. I. Spatiotemporal Contrast Sensitivity," J. Opt. Sec. Am., pp. 107-113, vol. 1, No. 1 (Jan. 1984).

Mojana F. et al.. Observations by spectral-domain optical coherence tomography combined with simultaneous scanning laser ophthalmoscopy: imaging of the vitreous, American Journal of Ophthalmol. Apr. 2010; 149(4):641-650.

Nidek, Scanning Laser Ophthalmoscope Mirante SLO/OCT Mirante SLO, https://www.nidek-intl.com/product/ophthaloptom/diagnostic/dia_retina/mirante.htm.

Peter G. J. Barten, "Contrast Sensitivity of the Human Eye and its Effects on Image Quality," Chapter 3, pp. 27-40, Model for the spatial contrast sensitivity of the eye, (1999).

Pointer, J. S., & Hess, R. F. "The contrast sensitivity gradient across the human visual field: With emphasis on the low spatial frequency range,", R. F. Vision Research, 29(9), 1133-1151 (1989).

Sebag J et al., Vitreous and Vitreoretinal Interface, Ch. 21, 2015.

Sebag J., Vitreous and Vision Degrading Myodesopsia. Progress in Retinal and Eye Research Nov. 2020;79.

T Ivanova et al., Vitrectomy for primary symptomatic vitreous opacities: an evidence-based review, Eye (Lond) May 2016;30(5):645-55.

Teri T Kleinberg et al., Vitreous substitutes: a comprehensive review, Survey of Ophthalmology, 56 (4), 2011.

Damodaran et al., "Digital micromirror device based ophthalmoscope with concentric circle scanning", 2017, pp. 2766-2780, vol. 8, No. 5, Biomedical Optics Express.

Fischer et al., "Scanning Laser Ophthalmoscopy (SLO)", In: Bille JF, editor. High Resolution Imaging in Microscopy and Ophthalmology: New Frontiers in Biomedical Optics [Internet], Aug. 14, 2019, accessed on Jan. 30, 2023 from https://www.ncbi.nlm.nih.gov/books/NBK554043, Springer.

Ginner et al., "Wide-Field OCT Angiography at 400 KHz Utilizing Spectral Splitting", Photonics, Oct. 23, 2014, pp. 369-379, vol. 1, No. 4.

Heidelberg Engineering GMBH, "Spectralis. Hardware Operating Instructions," Version 001, Aug. 2007.

Heidelberg Engineering, "Spectralis. Multimodal Imaging Platform Optimized for the Posterior Segment", accessed on Jan. 30, 2023 from https://business-lounge.heidelbergengineering.com/us/en/products/spectralis/spectralis/.

Hofer et al., "Dispersion encoded full range frequency domain optical coherence tomography", Jan. 5, 2009, pp. 7-24, vol. 17, No. 1, Optics Express, US.

Hofer et al., "Fast dispersion encoded full range optical coherence tomography for retinal imaging at 800 nm and 1060 nm", Mar. 1, 2010, pp. 4898-4919, vol. 18, No. 5, Optics Express.

Leitgeb et al., "Complex ambiguity-free Fourier domain optical coherence tomography through transverse scanning", 2007, pp. 3453-3455, vol. 32, Optics Letters.

Li et al., "DMD-based three-dimensional chromatic confocal microscopy", 2020, pp. 4349-4356, vol. 59, No. 14, Applied Optics.

Martial et al., "Programmable Illumination and High-Speed, Multi-Wavelength, Confocal Microscopy Using a Digital Micromirror", Aug. 2012, e43942, vol. 7, No. 8, PLOS ONE.

Reznicek Lukas et al., "Wide-Field Megahertz OCT Imaging of Patients with Diabetic Retinopathy", Journal of Diabetes Research, 2015, 5 pages.

Ruggeri et al., "Imaging and full-length biometry of the eye during accommodation using spectral domain OCT with an optical switch", Jul. 1, 2012, pp. 1506-1520, vol. 3, No. 7, Biomedical Optics Express.

Sarunic et al., "Instantaneous complex conjugate resolved spectral domain and swept-source OCT using 3×3 fiber couplers", Feb. 2005, pp. 957-967, vol. 13, No. 3, Optics Express.

Shields et al., "Wide-angle Imaging of the Ocular Fundus", Review of the Ophthalmology, Feb. 15, 2003.

Singh, "Lasers Take Aim at Floaters", Ophthalmology Management, Jul. 1, 2019, pp. 38, 40-42, 59, vol. 23.

Singh, "Modern vitreolysis—YAG laser treatment now a real solution for the treatment of symptomatic floaters", Survey of Ophthalmology, Mar. 3, 2020, pp. 581-591, vol. 65, No. 5.

SunLED, NanoPoint-0201 Series LEDs, published Feb. 15, 2016, www.SunLEDusa.com.

Volk Optical, "Volk Idrees Mid-Vitreous Lens", Dec. 20, 2020, accessed on Dec. 20, 2020 from https://www.volk.com/...s?pr_prod_strat=collection_fallbackpr_rec_pid=4513049018402 br_ref_pid=4513048952866pr_seq=uniform.

Volk Optical, "Volk Singh Mid-Vitreous Lens", Dec. 20, 2020, accessed on Dec. 20, 2020 from https://www.volk.com/products/singh-mid-vitreous-vitreous-slit-lamp-lens?_pos=3 &amp;amp;_ sid=b50c0674f&amp;amp;_ss=r.

Wang et al., "In vivo full range complex Fourier domain optical coherence tomography", Jan. 30, 2007, 054103, vol. 90, Applied Physics Letters.

Wojtkowski et al., "Full range complex spectral optical coherence tomography technique in eye imaging", 2002, pp. 1415-1417, vol. 27, No. 16, Optics Letters.

Yasuno et al., "Simultaneous B—M -mode scanning method for real-time full-range Fourier domain optical coherence tomography", 2006, pp. 1861-1865, vol. 45, No. 8, Applied Optics.

Zhang et al., Removal of a mirror image and enhancement of the signal-to-noise ratio in Fourier-domain optical coherence tomography using an electro-optic phase modulator, Jan. 15, 2005, vol. 30, No. 2, Optics Letters.

Zhou et al., "Dual channel dual focus optical coherence tomography for imaging accommodation of the eye", May 25, 2009, pp. 8947-8955, vol. 17, No. 11, Optics Express.

Blake F. Webb, et al.; "Prevalence of vitreous floaters in a community sample of smartphone users"; Internat'l Journal of Ophthalmology; Jun. 18, 2013; pp. 402-405; 6(3); PMC/ US National Library of Medicine National Institutes of Health.

Chirag P. Shah, et al., YAG Laser Vitreolysis vs Sham YAG Vitreolysis for Symptomatic Vitreous Floaters a Randomized Clinical Trial, JAMA Ophthalmology, Sep. 2017, 918-923, 135-9.

Ellex Website, Treatment Guidelines—Laser Floater Removal; 2016, Ellex Medical Pty Ltd. E&OE. VB0002E, downloaded Apr. 20, 2017.

Felix Sauvage et al: "Photoablation of Human Vitreous Opacities by Light—Induced Vapor Nanobubbles", ACS Nano, vol. 13, No. 7, Jul. 9, 2019, pp. 8401-8416.

(56) References Cited

OTHER PUBLICATIONS

Kim Jihwan et al. "Nonmechanical Laser Beam Steering Based on Polymer Polarization Gratings: Design Optimization and Demonstration", Journal of Lightwave Technology, vol. 33, No. 10, pp. 2068-2077, May 15, 2015.

Michael J. Escuti, et al., "Geometric-Phase Holograms", Optics & Photonics News, pp. 22-29, Feb. 2016.

Milston Rebecca et al: "Vitreous floaters: Etiology, diagnostics, and management", Survey of Ophthalmology, vol. 61, No. 2, Mar. 1, 2016, pp. 211-227.

Nicusor Iftimia et al.: "Hybrid retinal imaginer using line-scanning laser ophthalmoscopy and spectral domain optical coherence tomography", Optics Express, vol. 14, No. 26, Dec. 22, 2006.

Reece Bergstrom, et al., Vitreous Floaters, National Center for Biotechnology Information, May 21, 2020, 4 pages, Bookshelf ID NBK470420, StatPearls Publishing LLC, online.

Wikipedia Encyclopedia, Floater, Wikipedia Encyclopedia, Mar. 29, 2021, online: https://en.wikipedia.org/wiki/floater?wprov=sfti 1.

Zhang Yunbo et al: "Parallel large-range scanning confocal microscope based on a digital micromirror device", Optik vol. 124, No. 13 (2013), Aug. 4, 2012, pp. 1585-1588.

* cited by examiner

IMAGING A TARGET WITHIN AN EYE AND CALIBRATING IMAGING DEVICES

PRIORITY CLAIM

This application claims the benefit of priority of U.S. Provisional Patent Application Ser. No. 63/281,487, "IMAGING A TARGET WITHIN AN EYE AND CALIBRATING IMAGING DEVICES" filed on Nov. 19, 2021, which is hereby incorporated by reference in its entirety as though fully and completely set forth herein.

TECHNICAL FIELD

The present disclosure relates generally to ophthalmic laser surgical systems, and more particularly to imaging a target within an eye and calibrating imaging devices.

BACKGROUND

Laser vitreolysis uses laser beams to treat vitreous floaters and other retinal diseases. During a procedure, a laser beam is directed to the target, e.g., a floater, to fragment the target. The laser beam should be accurately and precisely delivered to the target to avoid damaging retinal tissues and ensure ocular safety. Known systems have attempted to improve accuracy and precision using image-guided laser beam delivery techniques. However, these techniques fail to provide satisfactory accuracy and precision in certain situations.

BRIEF SUMMARY

In certain embodiments, an ophthalmic laser surgical system for imaging and treating a target in an eye includes an imaging system, a treatment system, a beam combining and alignment device, a laser-OCT xy-scanner, and a computer. The eye has an eye axis that defines a z-axis, which defines xy-planes in the eye. The imaging system includes an optical coherence tomography (OCT) device that directs an OCT imaging beam along an imaging beam path towards the target in the eye, receives the OCT imaging beam reflected from the eye, and generates OCT images from the reflected OCT imaging beam. The treatment system includes a laser device that directs a laser beam along a laser beam path towards the eye. The beam combining and alignment device aligns the OCT imaging beam and the laser beam. The laser-OCT xy-scanner: receives the OCT imaging beam from the imaging system, directs the OCT imaging beam along the imaging beam path towards the eye, and scans the OCT imaging beam in an xy-plane in the eye; and receives the laser beam from the laser device, directs the laser beam along the laser beam path aligned with the imaging beam path towards the eye, and scans the laser beam in the xy-plane in the eye. The computer sends instructions to the OCT device and the laser device.

Embodiments may include none, one, some, or all of the following features:

The target comprises an eye floater.
The laser-OCT xy-scanner scans the OCT imaging beam in a continuous manner.
The laser-OCT xy-scanner scans the laser beam in a stepwise manner by scanning when the laser device is not firing the laser beam and ceasing scanning when the laser device is firing the laser beam.
The laser device directs the laser beam along towards a laser xy-location of a calibration pattern to yield a mark at the laser xy-location. The OCT device: directs the OCT imaging beam towards the calibration pattern; receives the OCT imaging beam reflected from the calibration pattern; and generates an OCT image of the mark on the calibration pattern from the reflected OCT imaging beam. The computer performs a registration procedure by: determining a difference between an OCT xy-location of the mark on the OCT image and the laser-xy-location of the mark; and calculating one or more correction parameters to compensate for the difference. The computer may perform the registration procedure while the laser-OCT xy-scanner is scanning in a continuous manner or in a stepwise manner.
The ophthalmic laser surgical system includes a scanning laser ophthalmoscope (SLO) device that: directs an SLO imaging beam along an SLO imaging beam path towards the eye; scans, by an SLO xy-scanner, the SLO imaging beam in an xy-plane in the eye; receives the SLO imaging beam reflected from the eye; and generates SLO images from the reflected SLO imaging beam.
The beam combining and alignment device mounted on a two-axis kinematic mount.
The beam combining and alignment device comprising a beam combiner or a dichroic mirror.

In certain embodiments, an ophthalmic laser surgical system for imaging and treating a target in an eye includes an imaging system, a treatment system, a laser-OCT xy-scanner, and a computer. The eye has an eye axis that defines a z-axis, which defines xy-planes in the eye. The imaging system includes an optical coherence tomography (OCT) device and a scanning laser ophthalmoscope (SLO) device. The OCT device directs an OCT imaging beam along an imaging beam path towards the target in the eye, receives the OCT imaging beam reflected from the eye, and generates OCT images from the reflected OCT imaging beam. The SLO device directs an SLO imaging beam along an SLO imaging beam path towards the target in the eye, receives the SLO imaging beam reflected from the eye, and generates SLO images from the reflected SLO imaging beam. The SLO device includes an SLO xy-scanner that scans the SLO imaging beam in an xy-plane in the eye. The treatment system includes a laser device that directs a laser beam along a laser beam path towards the eye. The laser-OCT xy-scanner: receives the OCT imaging beam from the imaging system, directs the OCT imaging beam along the imaging beam path towards the eye, and scans the OCT imaging beam in an xy-plane in the eye; and receives the laser beam from the laser device, directs the laser beam along the laser beam path aligned with the imaging beam path towards the eye, and scans the laser beam in the xy-plane in the eye. The computer sends instructions to the OCT device and the laser device.

Embodiments may include none, one, some, or all of the following features:

The target comprises an eye floater.
The laser-OCT xy-scanner and the SLO xy-scanner scan concurrently.
The OCT device determines a z-location of the target relative to the z-axis.
The SLO device determines an xy-location of the target relative to an xy-plane.
The SLO images comprising enface images.
The computer tracks the target according to the plurality of SLO images.
The computer aims the laser beam according to the OCT images and instructs the laser device to fire the laser beam.

The SLO device generates the SLO images while the laser device fires the laser beam.

The OCT device directs the OCT imaging beam along the OCT imaging beam path towards a calibration pattern, receives the OCT imaging beam reflected from the calibration pattern, and generates an OCT image of the calibration pattern from the reflected OCT imaging beam. The SLO device directs the SLO imaging beam along the SLO imaging beam path towards the calibration pattern, receives the SLO imaging beam reflected from the calibration pattern, and generates an SLO image of the calibration pattern from the reflected SLO imaging beam. The computer determines one or more differences between the OCT image and the SLO image of the calibration pattern, and calculates one or more correction parameters to compensate for the differences between the OCT image and the SLO image of the calibration pattern.

DESCRIPTION OF EXAMPLE EMBODIMENTS

Figure 1:
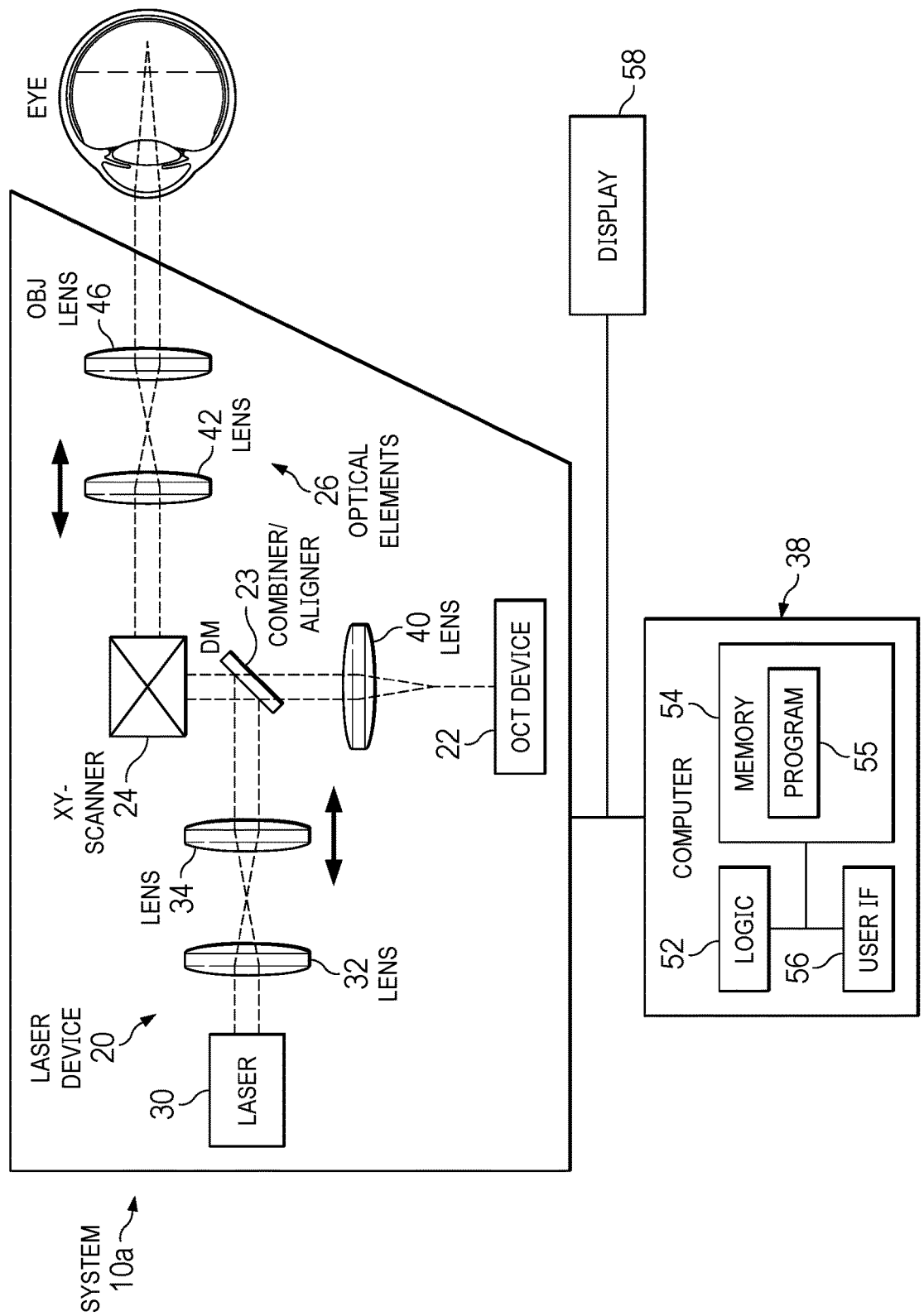
FIG. 1 illustrates an example of an ophthalmic surgical system that can image and treat a target in an eye, according to certain embodiments.

Referring now to the description and drawings, example embodiments of the disclosed apparatuses, systems, and methods are shown in detail. The description and drawings are not intended to be exhaustive or otherwise limit the claims to the specific embodiments shown in the drawings and disclosed in the description. Although the drawings represent possible embodiments, the drawings are not necessarily to scale and certain features may be simplified, exaggerated, removed, or partially sectioned to better illustrate the embodiments.

Known image-guided laser beam delivery systems require registration of imaging and laser beam systems to precisely guide the beam. However, known registration techniques are complicated and often do not provide sufficient levels of accuracy. Moreover, inherent variations of the optical properties of eyes make reliable registration difficult.

Accordingly, embodiments of the systems described herein include: (1) an imaging system with an optical coherence tomography (OCT) device that directs an imaging beam towards the target to generate an image of the target; and (2) a treatment system that directs a laser beam to the target to fragment the target. The imaging and laser beams share a laser-OCT xy-scanner to automatically register the beams. In certain embodiments, the imaging system also includes a scanning laser ophthalmoscope (SLO) device with an SLO xy-scanner. The laser-OCT and SLO xy-scanners may be registered using a calibration pattern.

FIG. 1 illustrates an example of an ophthalmic surgical system 10a that can image and treat a target in an eye, according to certain embodiments. In the example, the target is a vitreous eye floater or the shadow it casts on the retina. In the example, an axis of the eye (e.g., visual or optical) defines a z-axis, which in turn define x- and y-axes orthogonal to each other and to the z-axis. X- and y-axes define xy-planes within the eye. X-, y-, and z-directions and locations are relative to the x-, y-, and z-axes, respectively.

In the example, system 10a includes a treatment system (which comprises a laser device 20), an imaging system (which comprises optical coherence tomography (OCT) device 22), a beam combining and alignment device 23, a laser-OCT xy-scanner 24, optical elements 26, and a computer 38, coupled as shown. Laser device 20 includes a laser 30 and lenses 32, 34, coupled as shown. Optical components includes beam combining and alignment device 23 and lenses 32, 34, 40, 42, and 46, coupled as shown. Computer 38 includes logic 52, memory 54 (which stores a computer program 55), a user interface (IF) 56, and a display 58, coupled as shown.

As an example of operation, OCT device 22 directs an OCT imaging beam along an imaging beam path towards the eye, receives the OCT imaging beam reflected from the eye, and generates OCT images from the reflected OCT imaging beam. Laser device 20 directs a laser beam along a laser beam path towards the target. Beam combining and alignment device 23 combines and co-aligns the OCT imaging beam and the laser beam. Laser-OCT xy-scanner 24 receives the OCT imaging beam from the imaging system, directs the OCT imaging beam along the imaging beam path towards the target, and scans the OCT imaging beam in an xy-plane in the eye. Laser-OCT xy-scanner 24 also receives the laser beam from the laser device, directs the laser beam along the laser beam path co-aligned with the imaging beam path towards the target, and scans the laser beam in an xy-plane in the eye. Computer 38 sends instructions to the OCT device and the laser device.

Turning to the treatment system, laser 30 of laser device 22 generates a laser beam with any suitable wavelength, e.g., in a range from 400 nm to 2000 nm. Laser device 22 delivers laser pulses at any suitable repetition rates ranging from, but not limited to, 1 hertz (Hz) to several hundreds of kilohertz (kHz). A laser pulse may have any suitable pulse duration (e.g., ranging from, but not limited to, a nanosecond (ns) to 20 femtoseconds (fs)), any suitable pulse energy (e.g., 1 microjoule (uJ) to 10 millijoule (mJ)), and a focal point of any suitable size (e.g., ranging from 3 to 20 microns (μm), such as 7 μm). Lenses 32 and 34 are used to adjust the focus position of the laser beam within tissue, such as eye tissue.

OCT device 22 may be any suitable device that utilizes optical coherence tomography to generate images, e.g., a swept-source OCT (SS-OCT), line-field OCT, full-field OCT, or spectral-domain OCT (SD-OCT) device.

Beam combining and alignment device 23 combines and co-aligns the OCT imaging beam and the laser beam. Beam combining and alignment device 23 may be any suitable device that directs and aligns laser beams along a desired beam path, e.g., a beam combiner or a dichroic mirror (DM). In certain embodiments, beam combining and alignment device 23 may be mounted on a two-axis kinematic mount.

Beam combining and alignment device 23 is positioned such that the laser and imaging beams are co-aligned, and then the mount is secured to maintain the alignment.

Laser-OCT xy-scanner 24 scans the laser and imaging beams transversely in xy-directions. Examples of scanners include a galvo scanner (e.g., a pair of galvanometrically-actuated scanner mirrors that can be tilted about mutually perpendicular axes), an electro-optical scanner (e.g., an electro-optical crystal scanner) that can electro-optically steer the beam, or an acousto-optical scanner (e.g., an acousto-optical crystal scanner) that can acousto-optically steer the beam. Laser-OCT xy-scanner 24 scans the OCT imaging beam and the laser beam in an xy-plane in the eye in any suitable manner. For example, xy-scanner 24 may scan a beam (e.g., the OCT imaging beam) in a continuous manner. As another example, xy-scanner 24 may scan a beam (e.g., the laser beam) in a stepwise manner, e.g., scanning when the laser device is not firing the laser beam and ceasing scanning when the laser device is firing the laser beam.

OCT device 22 and laser device 20 share xy-scanner 24, allowing for co-registration between the OCT imaging and treatment beams. That is, xy-scanner 24 receives the imaging beam from the imaging system and directs the imaging beam along the imaging beam path towards the target, and receives the laser beam from the laser device and directs the laser beam along the laser beam path co-aligned with the imaging beam path towards the target. The OCT imaging and treatment beams share the same path through the optics of the system and the eye, so are affected by the same optical properties and distortions along the beam path. Thus, if the imaging and treatment beams are aligned prior to xy-scanner 24, they are automatically aligned at the target location. This enables accurate and precise delivery of the laser beam to the target location identified using OCT images.

Optical elements includes beam combining and alignment device 23 and lenses 32, 34, 40, 42, and 46, coupled as shown. In general, an optical element can act on (e.g., transmit, reflect, refract, diffract, collimate, condition, shape, focus, modulate, and/or otherwise act on) a laser beam. Examples of optical elements include a lens, prism, mirror, diffractive optical element (DOE), holographic optical element (HOE), and spatial light modulator (SLM). In the example, lens 40 collimates the beam from OCT device 22 to and from beam combining and alignment device 23. Beam combining and alignment device 23 directs beams from OCT device 22 and laser device 20 to xy-scanner 24 and directs beams reflected from the eye back to OCT device 22. Lenses 32 and 34 collimate the beam from laser 30 and can also adjust the focus of a laser beam in the eye. Lens 42 and objective lens 46 collimate and focus beams toward the eye.

Computer 38 sends instructions to the OCT device and the laser device. Computer 38 may utilize computer programs 55 to perform operations. Examples of computer programs 55 include target imaging, target tracking, image processing, and target evaluation. In certain embodiments, computer 26 may use an image processing program 55 to perform image processing on an image, e.g., analyze the digital information of the image to extract information from the image. In certain embodiments, computer 26 performs image processing to analyze an image of a target or a target's shadow (i.e., "target shadow") to obtain information about the target. Localized opacities in the vitreous, such as floaters, can affect vision quality when they are in the path of light and cast a shadow onto the retina. Hence, the target shadow can provide useful information about clinical significance of the floater or other opacity, e.g., the density or contrast of the floater shadow may indicate the level of vision obstruction caused by the floater. In certain embodiments, computer 26 may use a floater shadow tracking program 55 to track floaters. Moving shadows may indicate the presence of symptomatic floaters that cause vision obstruction, rather than other vitreous structures or features that do not cause sufficient vision obstruction.

Figure 2:
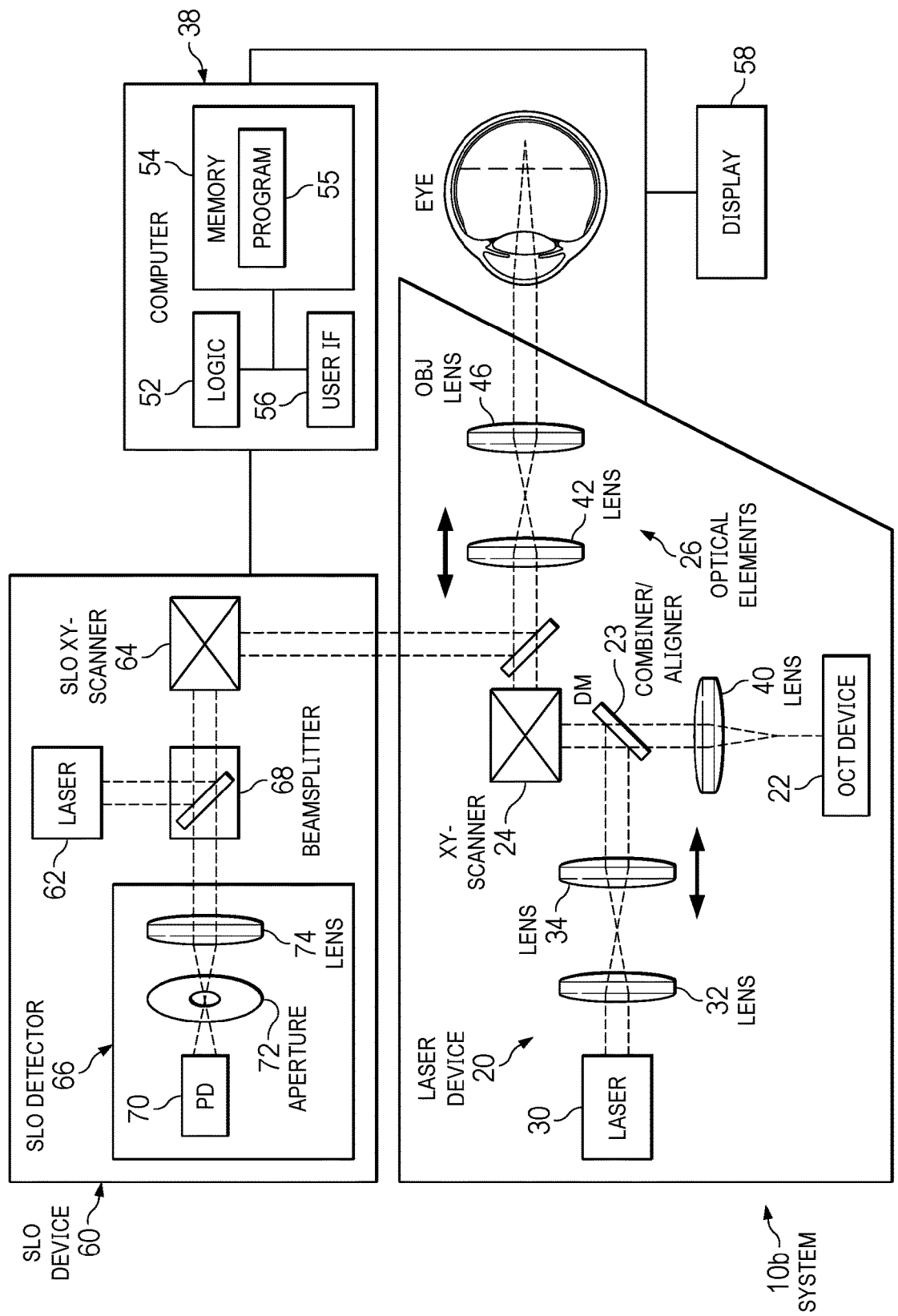
FIG. 2 illustrates another example of an ophthalmic surgical system that can image and treat a target in an eye, according to certain embodiments.

FIG. 2 illustrates another example of an ophthalmic surgical system 10b that can image and treat a target in an eye, according to certain embodiments. In the example, system 10b is substantially similar to system 10a of FIG. 1, except that a scanning laser ophthalmoscope (SLO) device 60 has been added to the imaging system. In the example, SLO device 60 includes a laser 62, an SLO xy-scanner 64, an SLO detector 66, and a beamsplitter 68, coupled as shown. SLO detector includes a photodetector (e.g., photo-diode PD) 70, lens 72, and lens 74, coupled as shown. Analogous components of system 10b are as described with reference to FIG. 1.

In an example of operation, OCT device 22 directs an OCT imaging beam along an OCT imaging beam path towards the eye, receives the OCT imaging beam reflected from the eye, and generates OCT images from the reflected OCT imaging beam. SLO device 60 directs an SLO imaging beam along an SLO imaging beam path towards the eye, receives the SLO imaging beam reflected from the eye, and generates SLO images from the reflected SLO imaging beam. SLO xy-scanner 64 scans the SLO imaging beam in an xy-plane in the eye. Laser device 20 directs a laser beam along a laser beam path towards the target. Laser-OCT xy-scanner 24 receives the OCT imaging beam from the imaging system, directs the OCT imaging beam along the imaging beam path towards the target, and scans the OCT imaging beam in an xy-plane in the eye. Laser-OCT xy-scanner 24 also receives the laser beam from the laser device, directs the laser beam along the laser beam path co-aligned with the imaging beam path towards the target, and scans the laser beam in an xy-plane in the eye. Computer 38 sends instructions to OCT device 22 and laser device 20.

Turning to the components, laser 62 of SLO device 60 generates any suitable SLO imaging beam, such as a laser beam with a visible or near-infrared wavelength. SLO xy-scanner 64 may be an xy-scanner as described with respect to laser-OCT xy-scanner 24. Beamsplitter 68 directs outgoing beams from laser 62 to SLO xy-scanner 64 and incoming reflected beams from the eye via SLO xy-scanner 64 to SLO detector 66. Lens 74 focuses the beam to confocal aperture 72, and the focused beam is directed to photodetector 70. Photodetector 70 detects light and generates a signal corresponding to the light. The signal may be used to generate SLO images.

OCT device 22 and SLO device 60 each provide different imaging characteristics. In certain embodiments, OCT device 22 can provide higher resolution two-dimensional (2D) and three-dimensional (3D) imaging over smaller regions. In certain embodiments, SLO device 60 can provide larger field of view (FOV) imaging and a faster 2D imaging refresh rate than that of 3D imaging by OCT device 22. For example, SLO device 60 may provide a 40 degrees or greater FOV and a 20 to 40 hertz (HZ) or greater refresh rates, while OCT device 22 may provide a 10 degrees FOV and a 10 to 20 Hz 3D refresh rate. The larger FOV of around 40 degrees allows for imaging a wider region of vitreous and retina in the eye, including the arcades to better detect floaters or other vitreous opacities that move. Moreover, target shadows may often yield higher contrast, clearer images than the targets themselves in SLO imaging. In addition, faster SLO refresh rates allow for more effective tracking of the target (e.g., by tracking the target shadow, as described above) and can yield shorter treatment times.

In certain embodiments, laser-OCT xy-scanner 24 and SLO xy-scanner 64 can scan concurrently, which allows for efficient concurrent operation of OCT device 22 and SLO device 60. For example, OCT device 22 determines the z-location of the target relative to the z-axis, while SLO device 60 determines the xy-location of the target relative to an xy-plane. As another example, OCT device 22 determines the xyz-location of the target relative to the x, y, and z-axes, while SLO device 60 provides real-time video of the eye. As another example, computer 38 can track the target according to SLO images, while aiming the laser beam according to the OCT images and instructing the laser device to fire the laser beam. As another example, SLO device 60 generates SLO images while laser device 20 fires the laser beam. As another example, SLO device 60 may detect unwanted motion of the eye during treatment and be used to shut off treatment.

Figure 3:
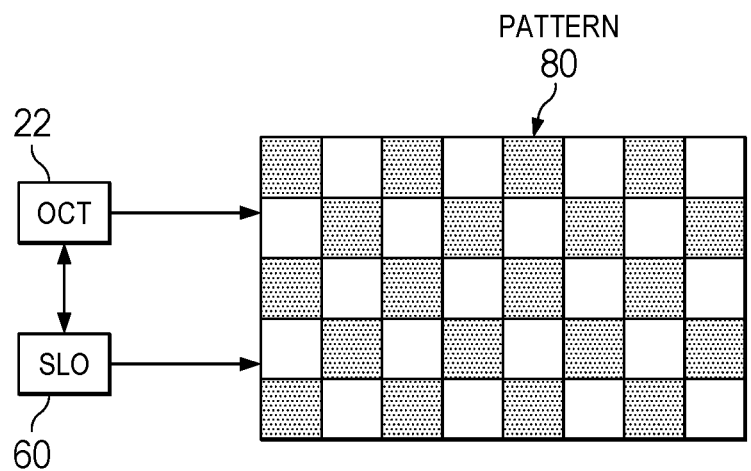
FIG. 3 illustrates an example of a calibration pattern that may be used by the system(s) of FIGS. 1 and/or 2 to register OCT, laser, and/or SLO devices, according to certain embodiments.

FIG. 3 illustrates an example of a calibration pattern 80 that may be used by system(s) 10 (10a, 10b) of FIGS. 1 and/or 2 to register OCT, laser, and/or SLO devices, such as OCT device 22 and SLO device 60, according to certain embodiments. For example, xy-scanner 24 of OCT device 22 and xy-scanner 64 of SLO device 60 may be registered.

Calibration pattern 80 may be any suitable pattern that can test the xy-scanning of an imaging device. Examples of such patterns include a checkerboard, concentric circles, concentric circles with radial lines or sectors, etc. Calibration pattern 80 may be disposed upon any suitable rigid medium. In certain embodiments, the pattern may be printed on an artificial eye to provide realistic scanning of a shape that represents the eye.

In an example of operation, OCT device 22 directs the OCT imaging beam along the imaging beam path towards calibration pattern 80, receives the OCT imaging beam reflected from calibration pattern 80, and generates an OCT image of calibration pattern 80 from the reflected OCT imaging beam. SLO device 60 directs the SLO imaging beam along the imaging beam path towards calibration pattern 80, receives the SLO imaging beam reflected from calibration pattern 80, and generates an SLO images of calibration pattern 80 from the reflected SLO imaging beam.

Continuing the example of operation, computer 38 determines differences between the OCT image and the SLO image of calibration pattern 80, and calculates correction parameters that compensate for the differences to register OCT device 22 and SLO device 60. For example, computer 38 determines the position of laser-OCT xy-scanner 24 that yields the OCT beam at an xy-location of calibration pattern 80, and the position of SLO xy-scanner 64 that yields the SLO beam at the same xy-location of calibration pattern 80. Computer 38 then calculates the differences between the positions to determine correction parameters that compensate for the differences.

In the illustrated example, calibration pattern 80 is used to register OCT device 22 and SLO device 60. However, calibration pattern 80 may be used for any suitable calibration. In certain embodiments, calibration pattern 80 is used to calibrate laser device 20 and OCT device 22. In the embodiments, laser device 20 directs the laser beam towards a laser xy-location of calibration pattern 80 to yield a mark at the laser xy-location. OCT device 22 directs the OCT imaging beam towards calibration pattern 80, receives the OCT imaging beam reflected from calibration pattern 80, and generates an OCT image of the mark on calibration pattern 80 from the reflected OCT imaging beam. Computer 38 performs a registration procedure by determining differences between the OCT xy-location of the mark on the OCT image and the laser-xy-location of the mark, and calculating correction parameters to compensate for the differences.

Computer 38 may perform the registration procedure at any suitable point. For example, registration may be performed at production, after transporting the system to a new location, at the customer location, and/or periodically throughout the life of the device. Computer 38 may perform the registration procedure under any suitable conditions. For example, computer 38 performs the registration procedure while laser-OCT xy-scanner 24 is scanning in a continuous manner. As another example, computer 38 performs the registration procedure while laser-OCT xy-scanner 24 is scanning in a stepwise manner.

Figure 4:
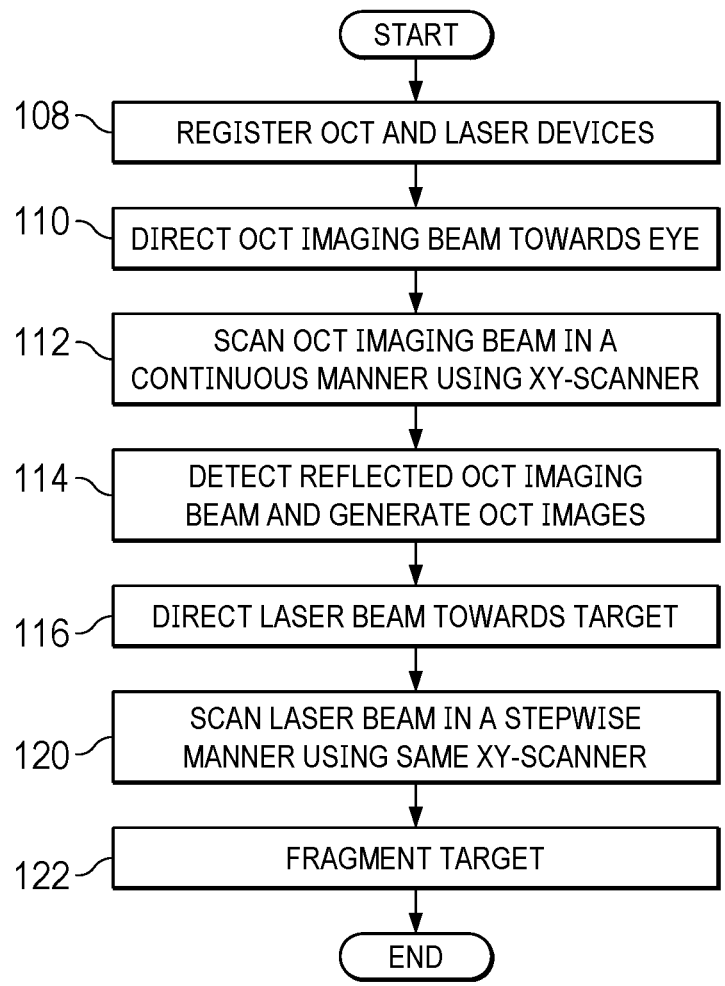
FIG. 4 illustrates an example of a method for imaging and treating a target in an eye that may be performed by the system(s) of FIGS. 1 and/or 2, according to certain embodiments.

FIG. 4 illustrates an example of a method for imaging and treating a target in an eye that may be performed by system(s) 10 (10a, 10b) of FIGS. 1 and/or 2, according to certain embodiments. The method starts at step 108, where OCT and laser devices are registered. In certain embodiments, to register the devices, the laser device directs a laser beam along towards an xy-location of a calibration pattern to yield a mark at the xy-location. The OCT device directs the OCT imaging beam towards the calibration pattern and generates an OCT image of the mark on the calibration pattern from the reflected OCT imaging beam. A computer may perform a registration procedure by determining differences between the OCT xy-location of the mark on the OCT image and the laser xy-location of the mark, and calculating correction parameters that compensate for the differences.

The OCT device directs an OCT imaging beam toward the eye at step 110. The xy-scanner scans the OCT imaging beam in the eye in a continuous manner at step 112. The interior of the eye reflects the OCT imaging beam. The OCT device detects the reflected OCT imaging beam and generates OCT images from the reflected beam at step 114.

The laser device directs a laser beams towards the target at step 116. The xy-scanner scans the laser beam in the eye in a stepwise manner at step 120. The xy-scanner may scan in a stepwise manner by scanning when the laser device is not firing the laser beam and ceasing scanning when the laser device is firing the laser beam. Since the OCT and laser devices share the xy-scanner, if the imaging and treatment beams are co-aligned prior to the xy-scanner, the two beams are automatically registered. (If there is a misalignment between the beams prior to the xy-scanner, a correction parameter obtained from registering the OCT and laser devices can be applied to compensate for the misalignment.) The target is fragmented at step 122.

Figure 5:
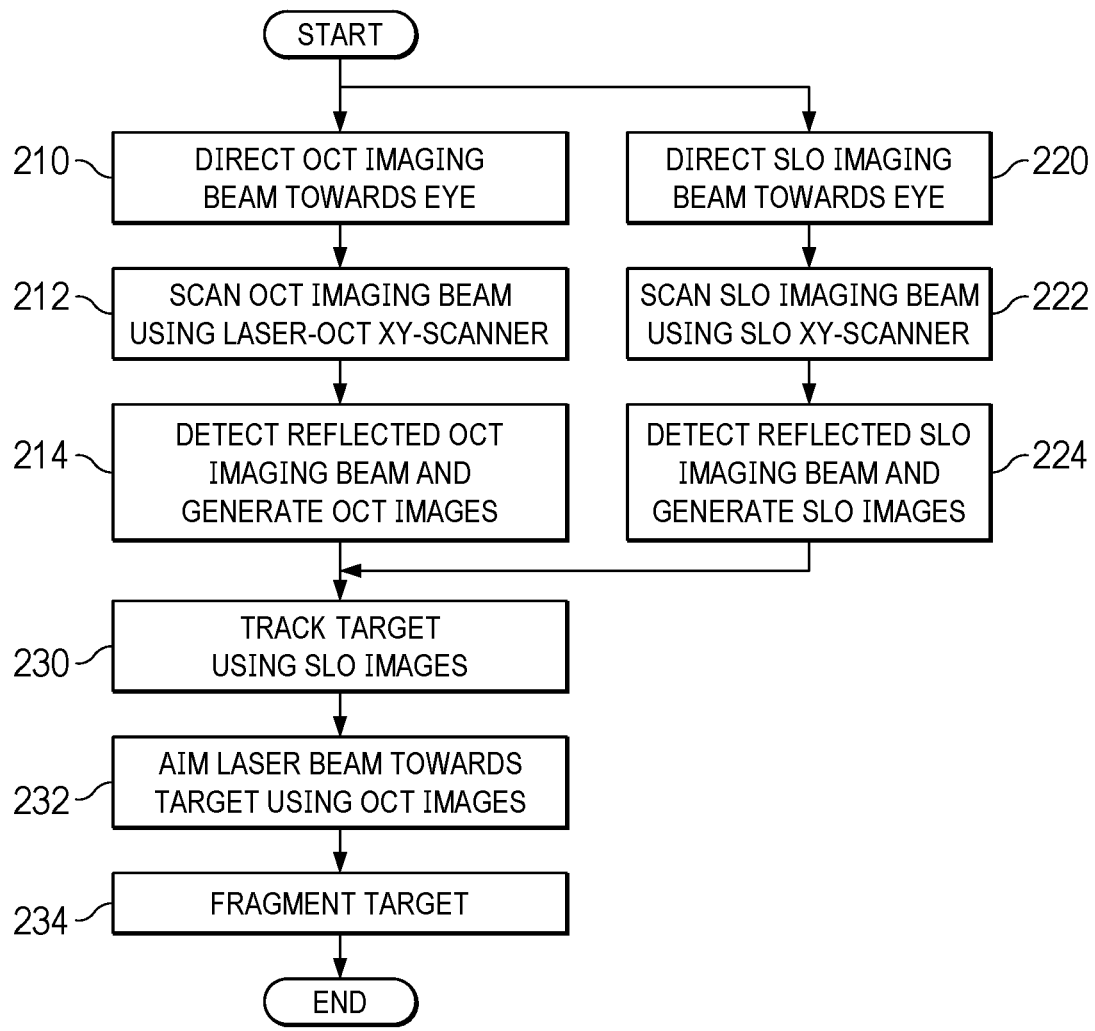
FIG. 5 illustrates an example of a method for imaging and treating a target in an eye that may be performed by the system(s) of FIGS. 1 and/or 2, according to certain embodiments.

FIG. 5 illustrates an example of a method for imaging and treating a target in an eye that may be performed by system(s) 10 (10a, 10b) of FIGS. 1 and/or 2, according to certain embodiments. The method starts at steps 210 and 220. Steps 210, 212, and 214 may be performed concurrently with steps 220, 222, and 224 to concurrently generate OCT and SLO images. The OCT and SLO devices use different scanners, which facilitates concurrent generation of the OCT and SLO images.

The OCT device directs an OCT imaging beam toward the eye at step 210. The laser-OCT xy-scanner scans the OCT imaging beam in the eye at step 212. The OCT device detects the reflected OCT imaging beam and generates OCT images from the reflected beam at step 214. The SLO device directs an SLO imaging beam toward the eye at step 220. The SLO xy-scanner scans the SLO imaging beam in the eye at step 222. The SLO device detects the reflected SLO imaging beam and generates SLO images from the reflected beam at step 224.

The computer tracks the target using the SLO images at step 230. In certain embodiments, the SLO device has a faster frame refresh rate and/or wider field of view than the OCT device, so is better able to track a moving target. The laser device aims the laser beam at the target using the OCT images at step 232. The OCT and laser devices share an xy-scanner, allowing for co-registration between the imaging and treatment beams. (If appropriate, correction parameters may be applied to compensate for a misalignment or other error between any of the components of system 10, e.g., the SLO, OCT, and/or laser device.) The target is fragmented at step 234.

Figure 6:
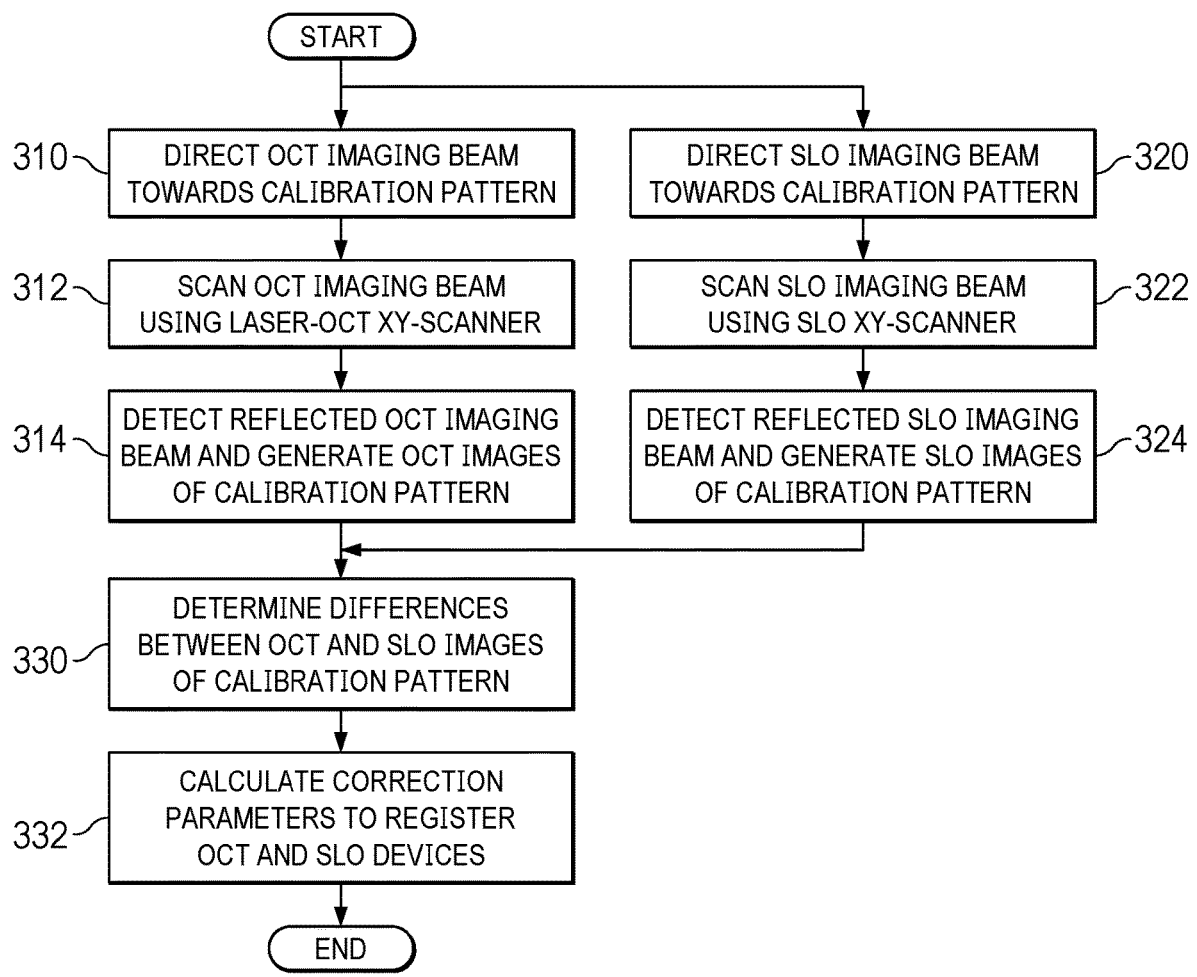
FIG. 6 illustrates an example of a method for registering OCT and SLO devices that may be performed by the system(s) of FIGS. 1 and/or 2, according to certain embodiments.

FIG. 6 illustrates an example of a method for registering OCT and SLO devices that may be performed by system(s) 10 (10a, 10b) of FIGS. 1 and/or 2, according to certain embodiments. In certain embodiments, the OCT and SLO devices use different scanners, so the method may be performed to register the scanners of the devices. The method starts at steps 310 and 320. Steps 310, 312, and 314 may be performed concurrently with steps 320, 322, and 324 to concurrently generate OCT and SLO images of a calibration pattern.

The OCT device directs an OCT imaging beam toward the calibration pattern at step 310. The laser-OCT xy-scanner scans the OCT imaging beam across the calibration pattern at step 312. The OCT device detects the reflected OCT imaging beam and generates OCT images of the calibration pattern from the reflected beam at step 314. The SLO device directs an SLO imaging beam toward the calibration pattern at step 320. The SLO xy-scanner scans the SLO imaging beam across the calibration pattern at step 322. The SLO device detects the reflected SLO imaging beam and generates SLO images of the calibration pattern from the reflected beam at step 324.

The computer determines differences between the OCT and SLO images of the calibration pattern at step 330. The computer determines correction parameters that compensate for the differences at step 332 in order to register the OCT and SLO devices. For example, the computer determines the position of the laser-OCT xy-scanner that yields the OCT beam at an xy-location of the calibration pattern, and the position of the SLO xy-scanner that yields the SLO beam at the same xy-location of the calibration pattern. The computer calculates the differences between the positions to determine correction parameters that compensate for the differences.

A component (such as the control computer) of the systems and apparatuses disclosed herein may include an interface, logic, and/or memory, any of which may include computer hardware and/or software. An interface can receive input to the component and/or send output from the component, and is typically used to exchange information between, e.g., software, hardware, peripheral devices, users, and combinations of these. A user interface is a type of interface that a user can utilize to communicate with (e.g., send input to and/or receive output from) a computer. Examples of user interfaces include a display, Graphical User Interface (GUI), touchscreen, keyboard, mouse, gesture sensor, microphone, and speakers.

Logic can perform operations of the component. Logic may include one or more electronic devices that process data, e.g., execute instructions to generate output from input. Examples of such an electronic device include a computer, processor, microprocessor (e.g., a Central Processing Unit (CPU)), and computer chip. Logic may include computer software that encodes instructions capable of being executed by an electronic device to perform operations. Examples of computer software include a computer program, application, and operating system.

A memory can store information and may comprise tangible, computer-readable, and/or computer-executable storage medium. Examples of memory include computer memory (e.g., Random Access Memory (RAM) or Read Only Memory (ROM)), mass storage media (e.g., a hard disk), removable storage media (e.g., a Compact Disk (CD) or Digital Video or Versatile Disk (DVD)), database, network storage (e.g., a server), and/or other computer-readable media. Particular embodiments may be directed to memory encoded with computer software.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, or the operations of the systems and apparatuses may be performed by more, fewer, or other components, as apparent to those skilled in the art. As another example, modifications may be made to the methods disclosed herein. The methods may include more, fewer, or other steps, and the steps may be performed in any suitable order, as apparent to those skilled in the art.

To aid the Patent Office and readers in interpreting the claims, Applicants note that they do not intend any of the claims or claim elements to invoke 35 U.S.C. § 112 (f), unless the words "means for" or "step for" are explicitly used in the particular claim. Use of any other term (e.g., "mechanism," "module," "device," "unit," "component," "element," "member," "apparatus," "machine," "system," "processor," or "controller") within a claim is understood by the applicants to refer to structures known to those skilled in the relevant art and is not intended to invoke 35 U.S.C. § 112 (f).

What is claimed:

1. An ophthalmic laser surgical system for imaging and treating a target in an eye, comprising:
    an imaging system comprising an optical coherence tomography (OCT) device configured to:
        direct an OCT imaging beam along an imaging beam path towards the target in the eye, the eye having an eye axis, the eye axis defining a z-axis, the z-axis defining a plurality of xy-planes in the eye;
        receive the OCT imaging beam reflected from the eye; and
        generate a plurality of OCT images from the reflected OCT imaging beam; and
    a treatment system comprising a laser device configured to direct a laser beam along a laser beam path towards the eye;
    a beam combining and alignment device configured to align the OCT imaging beam and the laser beam; and
    a laser-OCT xy-scanner configured to:
        receive the OCT imaging beam from the imaging system, direct the OCT imaging beam along the imaging beam path towards the eye, and scan the OCT imaging beam in an xy-plane in the eye; and
        receive the laser beam from the laser device, direct the laser beam along the laser beam path aligned with the imaging beam path towards the eye, and scan the laser beam in the xy-plane in the eye, the laser-OCT xy-scanner configured to scan the laser beam in the xy-plane in the eye by scanning the laser beam in a stepwise manner by scanning when the laser device is not firing the laser beam and ceasing scanning when the laser device is firing the laser beam; and a computer configured to send instructions to the OCT device and the laser device.

2. The ophthalmic laser surgical system of claim 1, the target comprising an eye floater.

3. The ophthalmic laser surgical system of claim 1, the laser-OCT xy-scanner configured to scan the OCT imaging beam in the xy-plane in the eye by:

scanning the OCT imaging beam in a continuous manner.

4. The ophthalmic laser surgical system of claim 1:

the laser device configured to:
direct the laser beam along towards a laser xy-location of a calibration pattern to yield a mark at the laser xy-location; and the OCT device configured to:
direct the OCT imaging beam towards the calibration pattern;
receive the OCT imaging beam reflected from the calibration pattern; and
generate an OCT image of the mark on the calibration pattern from the reflected OCT imaging beam; and the computer configured to perform a registration procedure by:
determining a difference between an OCT xy-location of the mark on the OCT image and the laser xy-location of the mark; and
calculating one or more correction parameters to compensate for the difference.

5. The ophthalmic laser surgical system of claim 4, the computer configured to perform the registration procedure while the laser-OCT xy-scanner is scanning in a continuous manner.

6. The ophthalmic laser surgical system of claim 4, the computer configured to perform the registration procedure while the laser-OCT xy-scanner is scanning in a stepwise manner.

7. The ophthalmic laser surgical system of claim 1, further comprising a scanning laser ophthalmoscope (SLO) device configured to:
direct an SLO imaging beam along an SLO imaging beam path towards the eye;
scan, by an SLO xy-scanner, the SLO imaging beam in an xy-plane in the eye;
receive the SLO imaging beam reflected from the eye; and
generate a plurality of SLO images from the reflected SLO imaging beam.

8. The ophthalmic laser surgical system of claim 1, the beam combining and alignment device mounted on a two-axis kinematic mount.

9. The ophthalmic laser surgical system of claim 1, the beam combining and alignment device comprising a beam combiner or a dichroic mirror.

10. The ophthalmic laser surgical system of claim 1, wherein the computer is configured to perform a registration procedure by:
determining a difference between an OCT xy-location of a laser mark on the OCT image and a laser xy-location of the laser mark; and
calculating one or more correction parameters to compensate for the difference.

11. An ophthalmic laser surgical system for imaging and treating a target in an eye, comprising:

an imaging system comprising:
an optical coherence tomography (OCT) device configured to:
direct an OCT imaging beam along an OCT imaging beam path towards the target in the eye, the eye having an eye axis, the eye axis defining a z-axis, the z-axis defining a plurality of xy-planes in the eye;
receive the OCT imaging beam reflected from the eye; and
generate a plurality of OCT images from the reflected OCT imaging beam; and a scanning laser ophthalmoscope (SLO) device configured to:
direct an SLO imaging beam along an SLO imaging beam path towards the target in the eye;
receive the SLO imaging beam reflected from the eye; and
generate a plurality of SLO images from the reflected SLO imaging beam, the SLO device comprising an SLO xy-scanner configured to scan the SLO imaging beam in an xy-plane in the eye;

a treatment system comprising a laser device configured to direct a laser beam along a laser beam path towards the eye; and a laser-OCT xy-scanner configured to:
receive the OCT imaging beam from the imaging system, direct the OCT imaging beam along the OCT imaging beam path towards the eye, and scan the OCT imaging beam in an xy-plane in the eye; and
receive the laser beam from the laser device, direct the laser beam along the laser beam path aligned with the OCT imaging beam path towards the eye, and scan the laser beam in the xy-plane in the eye; and a computer configured to send instructions to the OCT device and the laser device.

12. The ophthalmic laser surgical system of claim 11, the target comprising an eye floater.

13. The ophthalmic laser surgical system of claim 11, the laser-OCT xy-scanner and the SLO xy-scanner configured to scan concurrently.

14. The ophthalmic laser surgical system of claim 11, the OCT device configured to: determine a z-location of the target relative to the z-axis.

15. The ophthalmic laser surgical system of claim 11, the SLO device configured to: determine an xy-location of the target relative to an xy-plane.

16. The ophthalmic laser surgical system of claim 11, the plurality of SLO images comprising a plurality of enface images.

17. The ophthalmic laser surgical system of claim 11, the computer configured to: track the target according to the plurality of SLO images.

18. The ophthalmic laser surgical system of claim 11, the computer configured to: aim the laser beam according to the OCT images; and
instruct the laser device to fire the laser beam.

19. The ophthalmic laser surgical system of claim 11, the SLO device configured to generate the SLO images while the laser device fires the laser beam.

20. The ophthalmic laser surgical system of claim 11:
the OCT device configured to:
direct the OCT imaging beam along the OCT imaging beam path towards a calibration pattern;

receive the OCT imaging beam reflected from the calibration pattern; and
generate an OCT image of the calibration pattern from the reflected OCT imaging beam; and the SLO device configured to:
  direct the SLO imaging beam along the SLO imaging beam path towards the calibration pattern;
  receive the SLO imaging beam reflected from the calibration pattern; and
  generate an SLO image of the calibration pattern from the reflected SLO imaging beam; and the computer configured to:
  determine one or more differences between the OCT image and the SLO image of the calibration pattern; and
  calculate one or more correction parameters to compensate for the differences between the OCT image and the SLO image of the calibration pattern.

* * * * *